US012680884B2

(12) United States Patent
Costello et al.

(10) Patent No.: US 12,680,884 B2
(45) Date of Patent: Jul. 14, 2026

(54) DETECTING A FAILURE IN A THERMOCOUPLE ARRAY

(71) Applicants: Rolls-Royce Corporation, Indianapolis, IN (US); Rolls-Royce North American Technologies Inc., Indianapolis, IN (US)

(72) Inventors: John Costello, Indianapolis, IN (US); Robert C. Dalley, Indianapolis, IN (US); Douglas Schetzel, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 424 days.

(21) Appl. No.: 18/362,333

(22) Filed: Jul. 31, 2023

(65) Prior Publication Data

US 2025/0044159 A1 Feb. 6, 2025

(51) Int. Cl.
*G01K 7/026* (2021.01)
*G01K 1/02* (2021.01)
*G01K 15/00* (2006.01)

(52) U.S. Cl.
CPC ............. *G01K 7/026* (2013.01); *G01K 1/026* (2013.01); *G01K 15/007* (2013.01); *F05D 2260/80* (2013.01)

(58) Field of Classification Search
CPC ...... G01K 1/026; G01K 7/026; G01K 15/007; F05D 2260/80
See application file for complete search history.

(56) References Cited

U.S. PATENT DOCUMENTS

| | | | | |
|---|---|---|---|---|
| 5,418,464 | A | 5/1995 | Swift | |
| 2006/0290366 | A1* | 12/2006 | Kon | G01R 31/2874 |
| | | | | 324/750.06 |
| 2007/0025412 | A1* | 2/2007 | Webb | G01K 7/026 |
| | | | | 374/57 |
| 2012/0179407 | A1* | 7/2012 | Ge | G01K 7/02 |
| | | | | 702/99 |

(Continued)

FOREIGN PATENT DOCUMENTS

| | | |
|---|---|---|
| CN | 110849494 B | 8/2021 |
| DE | 10 2005 049 804 A1 | 5/2006 |

(Continued)

OTHER PUBLICATIONS

U.S. Appl. No. 18/362,370, filed Jul. 31, 2023, naming inventors Costello et al.

*Primary Examiner* — Nathaniel J Kolb
(74) *Attorney, Agent, or Firm* — Shumaker & Sieffert, P.A.

(57) ABSTRACT

A method of monitoring a health of a temperature system may comprise selecting a temperature sensor of a plurality of temperature sensors arranged in an array, where each temperature sensor corresponds to an address within the array. The method may comprise identifying the address corresponding to the single temperature sensor, sending the address to a multiplexer, and selecting the single temperature sensor using the identified address. The method may comprise testing the selected single temperature sensor calculating an average temperature detected by the plurality of temperatures sensors.

20 Claims, 11 Drawing Sheets

(56) References Cited

U.S. PATENT DOCUMENTS

| | | | |
|---|---|---|---|
| 2013/0163633 A1 | 6/2013 | Liu et al. | |
| 2021/0062673 A1* | 3/2021 | Drolet | G01K 13/024 |
| 2021/0372858 A1* | 12/2021 | Costello | G01K 7/021 |

FOREIGN PATENT DOCUMENTS

| | | | |
|---|---|---|---|
| EP | 1748289 A2 | 1/2007 | |
| EP | 2 967 703 B1 | 3/2018 | |
| JP | 6745079 B2 | 8/2020 | |

* cited by examiner

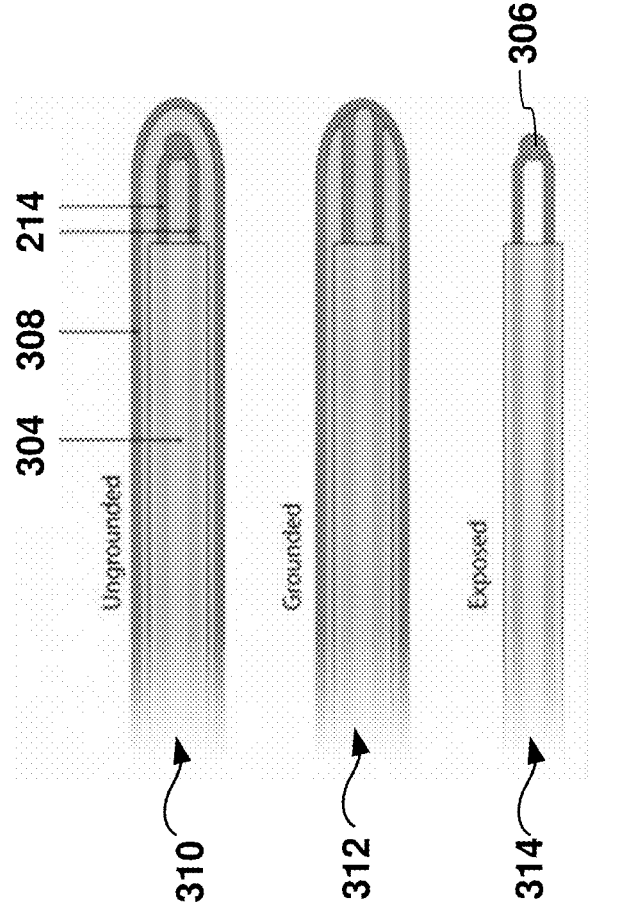
FIG. 3B
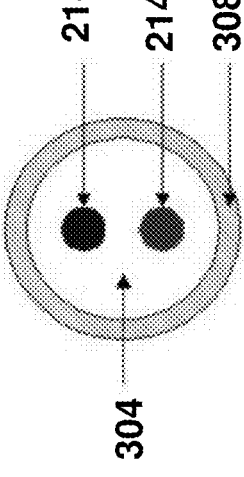
FIG. 3A
FIG. 3

DETECTING A FAILURE IN A THERMOCOUPLE ARRAY

TECHNICAL FIELD

This disclosure relates to temperature measurement systems and, in particular, to thermocouple arrays in turbine engines.

BACKGROUND

Present temperature measurement systems suffer from a variety of drawbacks, limitations, and disadvantages. For example, often thermocouples in temperature management systems are arranged in a parallel array, which are susceptible when even just one thermocouple in the system experiences a failure mode, such as thermocouple drift, open-circuit failure, or short-circuit failure. Such a failure in one thermocouple has the ability to affect the accuracy of the entire system. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 3A illustrates an example of a thermocouple assembly and components;

FIG. 3B illustrates an example of a thermocouple assembly and components;

DETAILED DESCRIPTION

A method of monitoring a health of a temperature system may comprise selecting a single temperature sensor from a plurality of temperature sensors to test. The plurality of temperature sensors may be arranged in an array, and each of the plurality of temperature sensors may correspond to an address within the array. The method may comprise identifying, via a controller, the address within the array corresponding to the single temperature sensor and sending the identified address to a multiplexer connected to the plurality of temperature sensors. The method may comprise selecting, via the multiplexer, the single temperature sensor using the identified address. The method may comprise testing, with the controller, the selected single temperature sensor and calculating an average temperature detected by the plurality of temperatures sensors. The method may comprise detecting a failure of the tested temperature sensor and identifying the temperature sensor to the controller. The method may comprise cycling through each one of the plurality of temperature sensors, using the controller and multiplexer, to test each sensor.

A temperature measurement system may comprise a plurality of temperature sensors arranged in an array, wherein each of the temperature sensors has a corresponding respective address. The system may comprise a multiplexer in selective communication with each one of the plurality of temperature sensors to isolate a single temperature sensor of the plurality of temperature sensors. The system may comprise a controller in communication with the multiplexer to identify a single temperature sensor to be selected by the multiplexer. The system may comprise test circuitry in communication with the controller to test a health of the isolated single temperature sensor.

One interesting feature of the systems and methods described below may be that a failure mode of one or more the thermocouples in the array will not affect the reading and output of the temperature system. Alternatively, or in addition, an interesting feature of the systems and methods described below may be that the use of the multiplexer and controller may enable individual health testing of each one of the thermocouples in the system. Each thermocouple may be cycled through a continuity and impedance test circuitry, and isolated from the system if a failure is detected. The isolation prevents the failed thermocouple from affecting a reading or measurement of the system as a whole, and may prompt replacement or repair of the damaged thermocouple. A failure may, for example, be when a measured value is outside a predetermined expected range.

Figure 1:
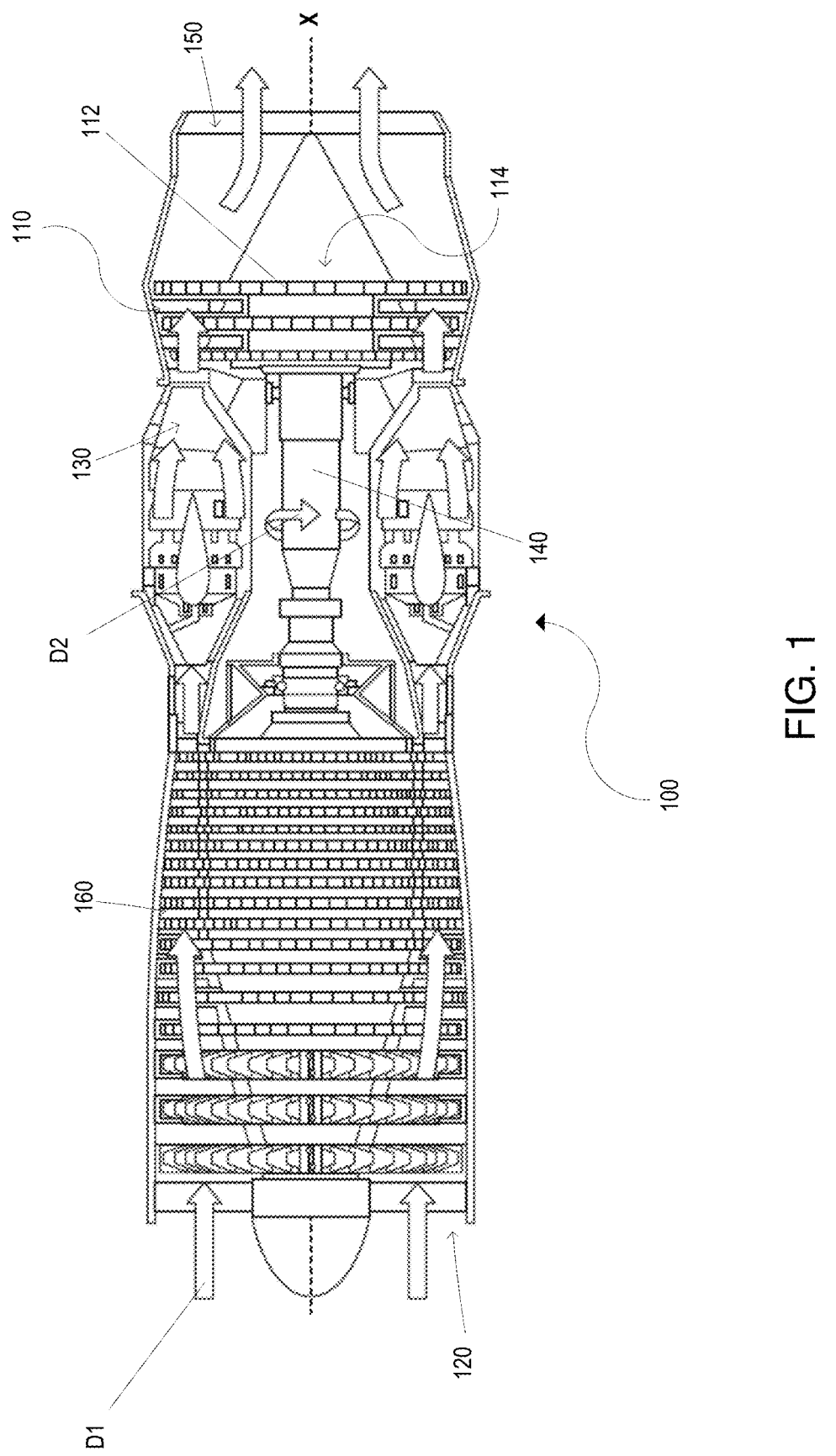
FIG. 1 illustrates a cross-sectional view of an example of a gas turbine engine.

FIG. 1 is a cross-sectional view of a gas turbine engine 100. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion or combustor section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples.

Temperature sensors 202 (shown in FIGS. 2-5), for example, thermocouples, may be arranged around difference sections of the gas turbine engine 100. For example, the temperature sensors 202 may be arranged around any section needed to monitor critical temperature. The temperature sensors may be, for example, arranged around the combustion section 130 and/or the exhaust section 150. For example, the temperature sensors 202 may be disposed around an outer diameter of gas turbine 100 sections, with a probe tip of the sensors disposed inside of the gas turbine engine 100 sections and exposed to the flow of hot gas or fluids flowing through the sections of the gas turbine engine 100.

Additionally or alternatively, the temperature sensors 202, the gas turbine engine 101, and/or sections of the gas turbine engine 100 may be connected to and/or in communication with a full authority digital engine control system (FADEC). Additionally or alternatively, the FADEC may be disposed on, within, or near a section of the gas turbine engine 100.

Figure 2:
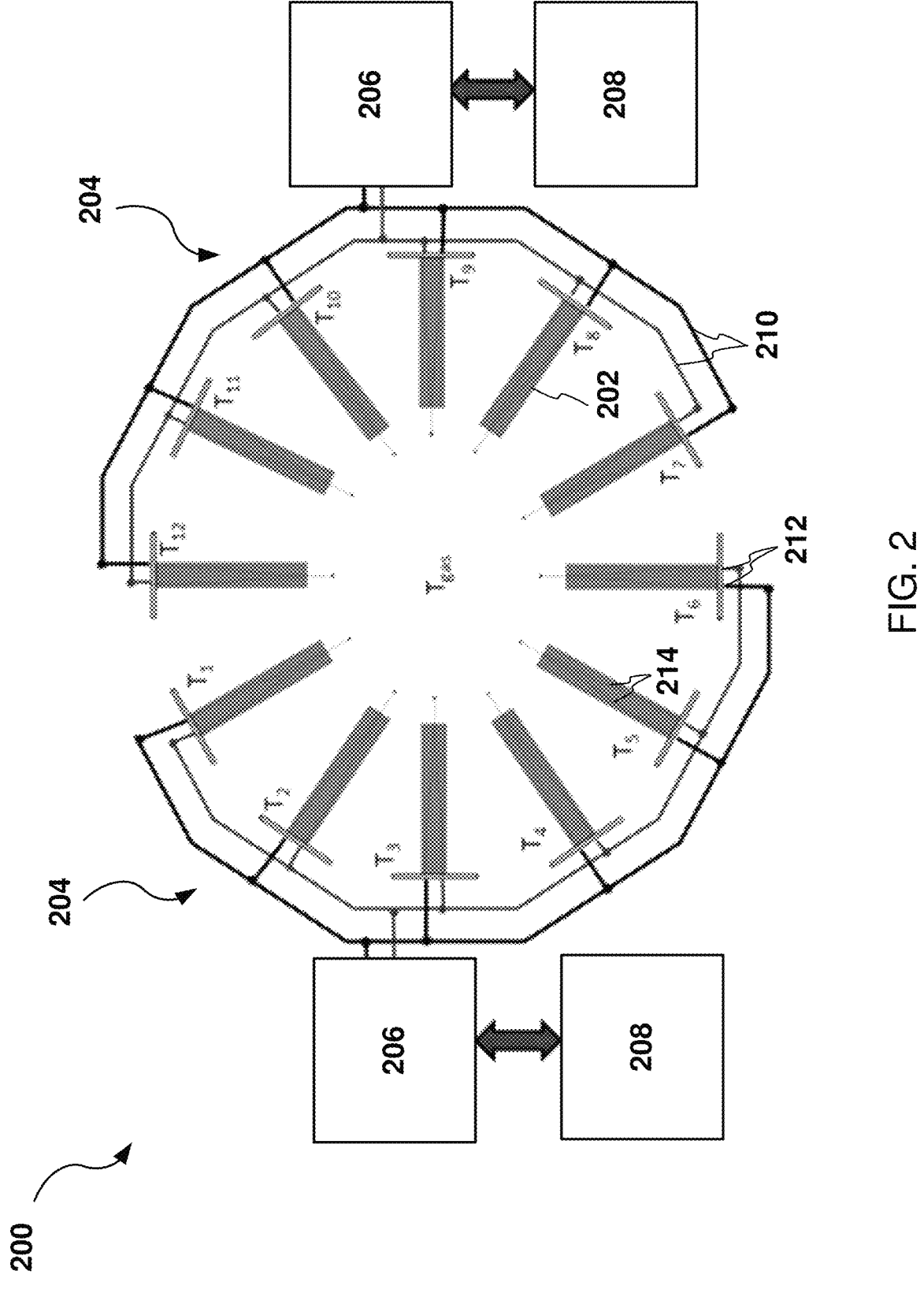
FIG. 2 illustrates an example of a typical thermocouple array.

FIG. 2 illustrates an example of a typical array 200 of temperature sensors 202 in a gas turbine engine. The array 200 may comprise one or more sets 204 of temperature sensors 202. Additionally or alternatively, the term array 200 may refer a set 204 of temperature sensors 202. The sets 204 may be, for example, arranged around one or more sections of a gas turbine engine 100. The sets 204 may each comprise multiple temperature sensors, for example, between two to ten temperature sensors 202 per set 204. The temperature sensors 202 may, for example, be thermocouples or any other device or sensor capable of measuring temperature. The temperature sensors 202 may be capable of measuring temperatures, for example, in the range of −200° C. to 1,400° C. The temperature sensors 202 in one of the sets 204 may, for example, be connected together in parallel with a harness 210 comprising, for example, or wires or any other suitable other connective device. For example, the array 200 and/or set 204 may comprise multiple temperature sensors 202 arrange together in parallel. The temperature sensor 202 may comprise attachment points 212 to connect the temperature sensor 202 to the harness 210. The attachment points 212 may, for example, be terminal studs, pig-tail leads with eyelets, or any other suitable attachment interface. Additionally or alternatively, the wires, for example, type K wires, of the temperature sensor 202 may extend through and past the attachment points 212 until the temperature measurement system 206. The connection interface between the harness 210 and the temperature sensor 202 may transition to the internal wires 214 of the temperature sensor 202, which may, for example, be type K wires.

The temperature sensor 202 sets 204 may be connected to, for example, a temperature measurement system 206 or any other device suitable for converting an output from the temperature sensor, for example a voltage reading in the example of a thermocouple, into a temperature reading. The temperature measurement system 206 may, for example, be connected to a controller 208, for example, a FADEC. Each set 204 may be arranged to output an averaged output voltage from the temperature sensors 202. For example, each set 204 may use an equation such as Equation 1 below to output the averaged output voltage. For example, because the array 200 and/or sets 204 of the temperature sensors 202 may be arranged in parallel, the array 200 and/or set 204 may output an average voltage of all of the temperature sensors 202 in the array 200 and/or set 204.

$$v(t_{emf}) = \sum_{i=1}^{i=6} V_{t_i}/6 \; V_{dc} \qquad \text{Equation 1}$$

FIGS. 3A and 3B illustrate a typical thermocouple assembly 202 and thermocouple 202 components. FIG. 3A shows a cross section through the diameter of a typical thermocouple 202, while FIG. 3B shows a cross-sectional side view of different types of thermocouples 202.

The thermocouples 202 shown in FIGS. 3A and 3B may, for example, be a close up, more detailed view of an example of the temperature sensors 202 in FIG. 2. The thermocouple 202 may comprise a body section 300, wires 214, an insulating material 304, a junction 306, and an outer sheath 308. The body section 300 of the thermocouple may be, for example, a high temperature alloy. The body section 300 of the thermocouple 202 may house the two wires 214, for example, type K wires (k+ and k−), along with an insulating material 304, for example, a mineral insulator powder. The wires 214 may act as conductors. This insulating material 304 may be, for example, Magnesium Oxide powder, for example, MGO or Alumina-Silicate.

The insulating material 304 may insulate the wires 214 and provides a strain relief to stabilize the two wires 214. The outer sheath 308 may extend along a length of the thermocouple 202, for example, from the attachment points 212 (shown in FIG. 2) to the end of the wires 214. In some examples, the sheath may extend past the end of the wires 214. The sheath 308 may surround and/or encase the internal components of the thermocouple 202. The, for example, K+ and K− wires 214 may be welded at a tip of the wires 214 to form a junction 306. FIG. 3B shows three example types of thermocouple tip configurations: ungrounded 310, where the tip of the wires 214 are welded together to form a junction 306; closed tip grounded 312, where the tip of the wires 214 are welded or otherwise connected to an end of the sheath 308; and open tip 314, where the thermocouple 202 does not have a sheath 308, leaving the end of the wires 214 and the insulating material 304 exposed to the environment.

Figure 4:
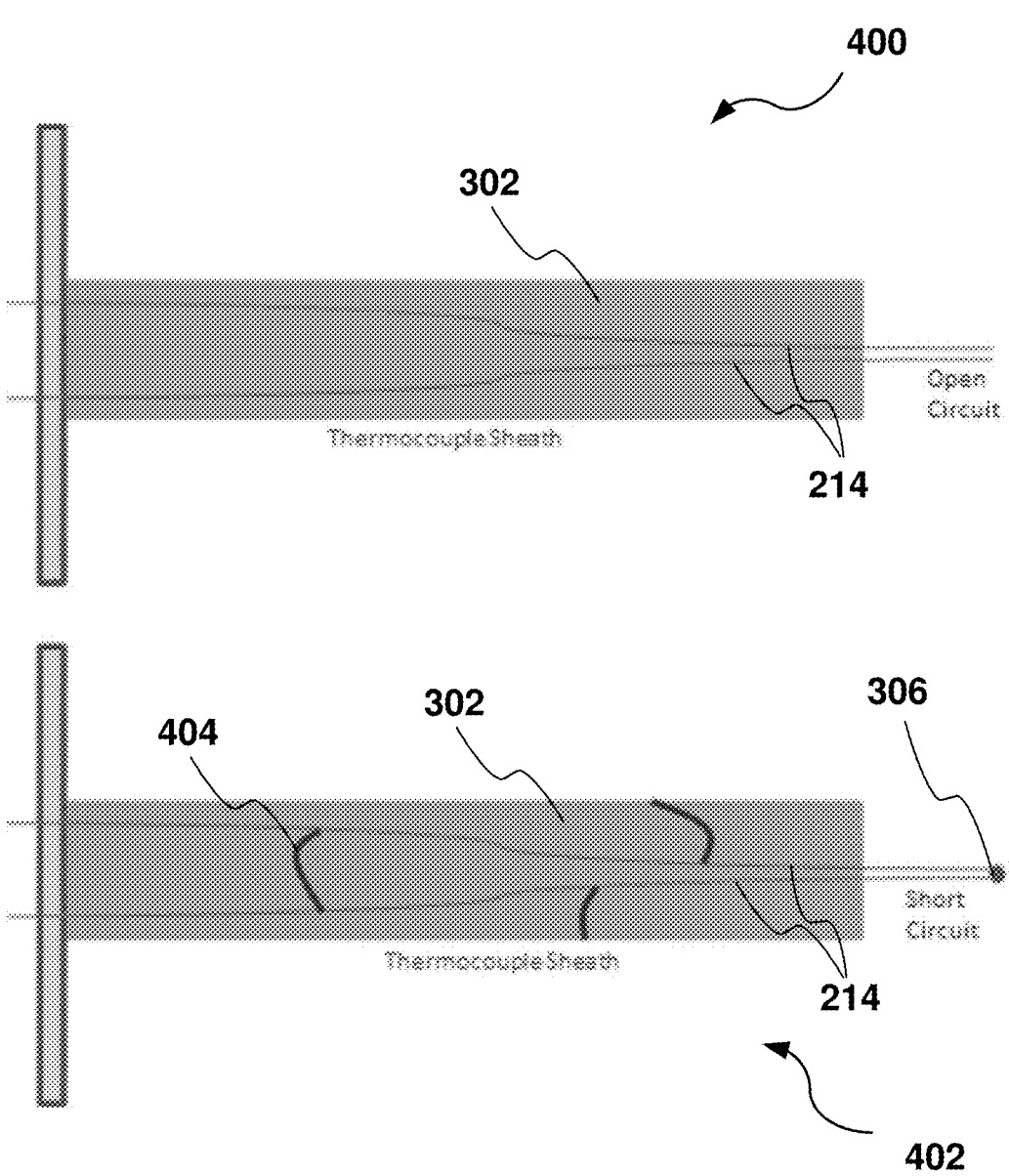
FIG. 4 illustrates an example of an open-circuit and a short-circuit failure mode.

FIG. 4 illustrates potential failure modes that may occur in an individual thermocouple 202, and that would affect that accuracy of a set 204 or array 200 (shown in FIG. 2). An open-circuit failure mode 400 may occur at the junction 306 or weld point connection, for example the K+ and K− wires 214 within the thermocouple 202 assembly. The open-circuit failure mode 400 may occur, for example, when the tips of the wires 214 become unconnected, for example the junction 306 fails or breaks apart leaving the tips of the wires 210 unconnected, and/or when the wires 214 become ungrounded to the sheath 308. A short-circuit failure mode 402 may occur when one or more electrical shorts 404 occur between the thermocouple 202 internal elements, such as the wires 214, due, for example, to a breakdown in the insulation material 302, for example, between the wire 214 and/or between the thermocouple internal elements, for example the wire 214, and the sheath 308 of the thermocouple 202. An open-circuit failure 400, a short-circuit failure 402, and/or drift of the thermocouple 202 outputs will affect the averaged output voltage from the array 200. In the event of a failure of one or more of the individual thermocouples 202 in the array 200, the accuracy of the temperature measurement will be reduced based on the type of failure mode.

Figure 5:
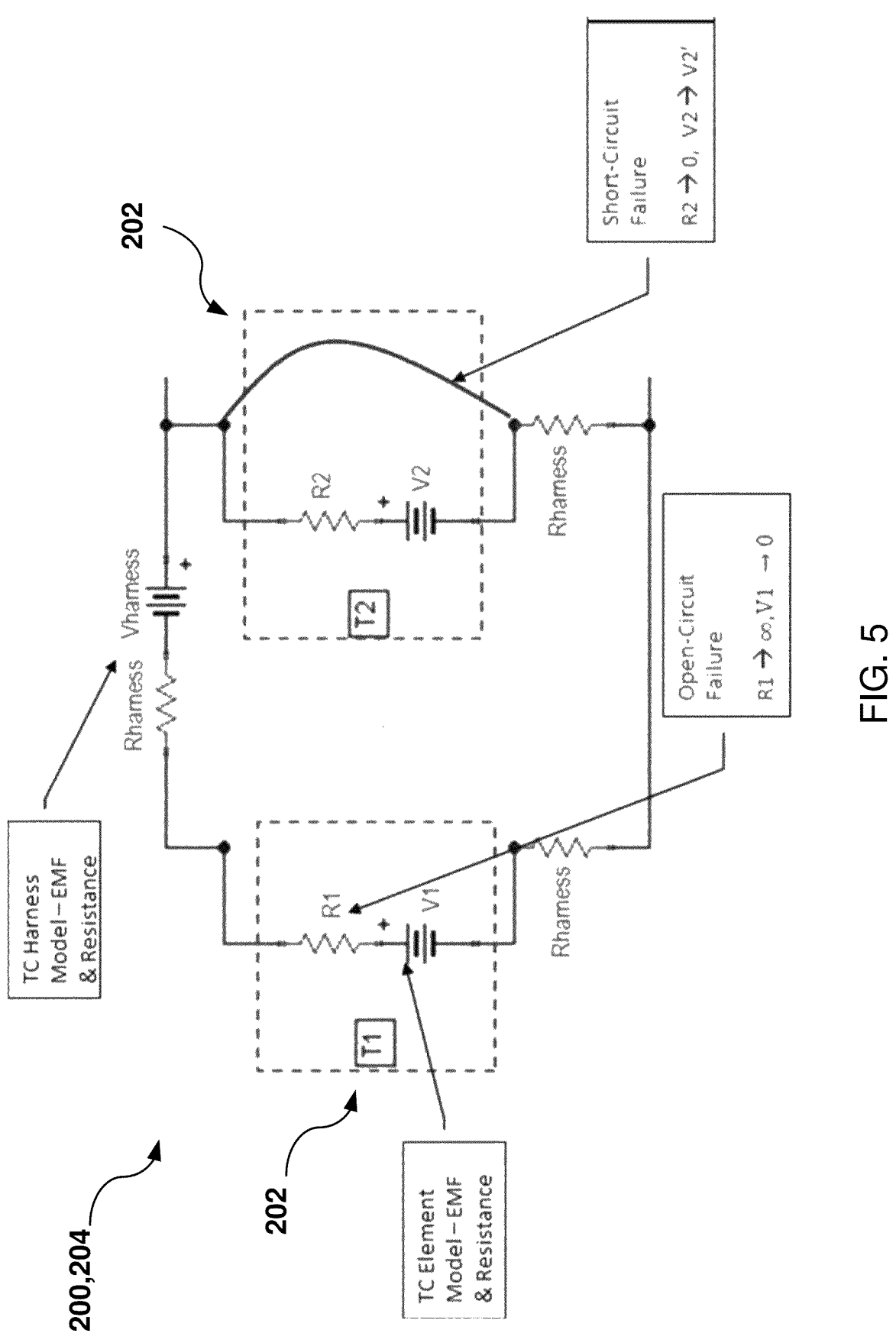
FIG. 5 illustrates a schematic of an open-circuit and a short-circuit failure mode.

FIG. 5 illustrates a schematic drawing of a portion of a thermocouple 202 array 200 or set 204 that has both an open-circuit and close-circuit failure. In an open-circuit failure mode, shown at thermocouple T1, an output of the thermocouple 202 will approach a 0 mV output value. In a short-circuit failure mode, shown at thermocouple T2, the output value from the thermocouple 202 will approach a new value, e.g. V2', as another bi-metallic junction has been created between the nodes, or wires 214, of the thermocouple 202. There may be a modified Seebeck potential created with a different output voltage that will no longer be similar to the expected or correct output value, for example, a Type K output of ~40 µV/° C. For example, in the case of a short-circuit failure, the unwanted tertiary junction created could generate an output value that could be considerably below the standard Type K output.

Figure 6:
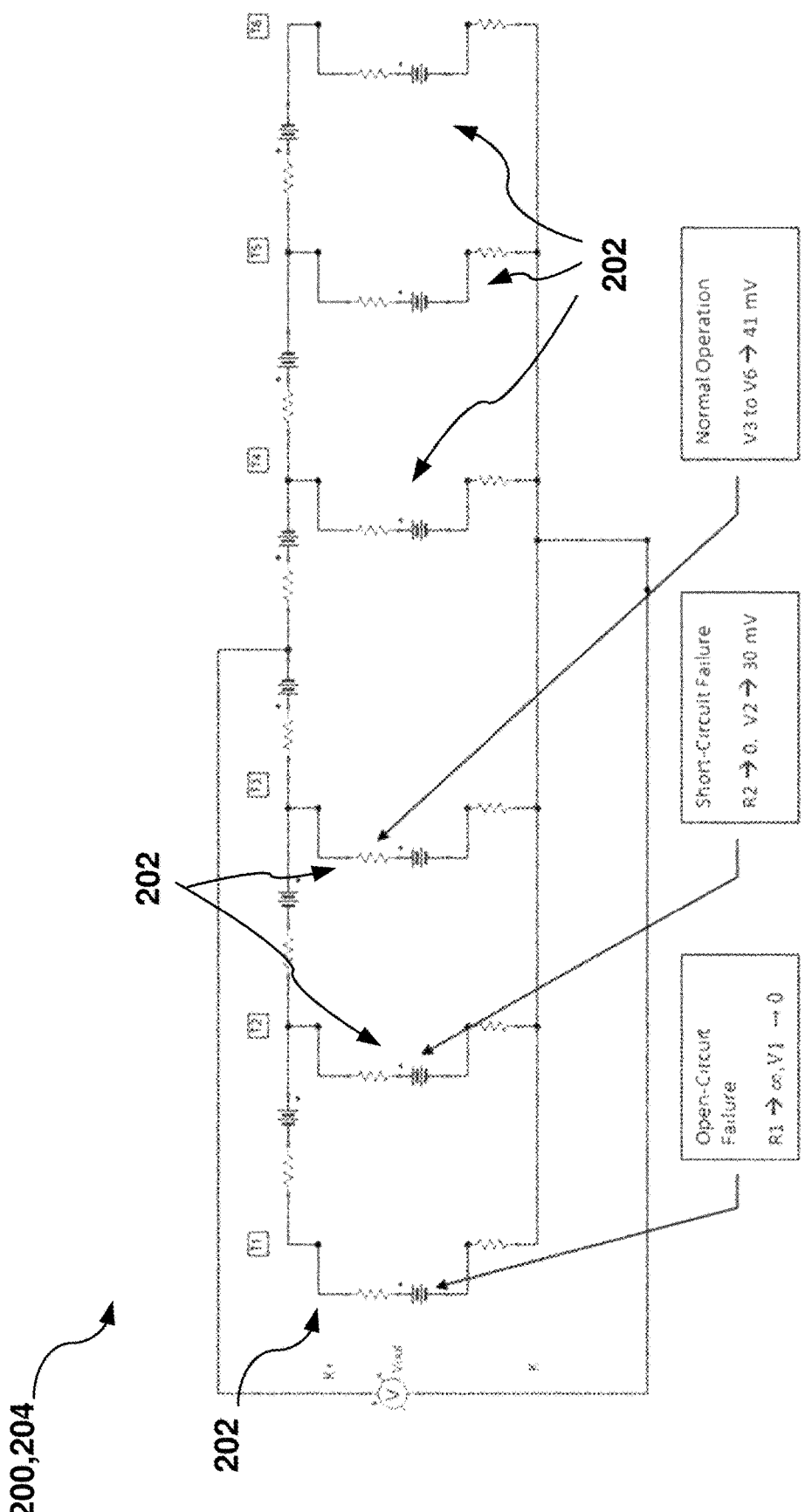
FIG. 6 illustrates a schematic of a thermocouple array with multiple failure modes.

FIG. 6 illustrates a schematic drawing of a thermocouple 202 array 200 or set 204 comprising six thermocouples 202, T1-T6, in a scenario where the array 200 or set 204 experiences both open-circuit and close-circuit failures. The thermocouples 202 may be, for example, Class 1 thermocouples that have an accuracy of ±1.5° C. from −40 to 375° C. and ±0.004*|t| from 375 to 1,000° C. To demonstrate the possible inaccuracy that may occur from the set 204 of thermocouple 202 with the open-circuit and close-circuit failure modes in FIG. 6, for example, a temperature of 1,000° C. may be assumed for the thermocouples 202. The thermocouple 202 at T1 in the set 204 may have an open-circuit failure mode and generate an output of 0 mV. The thermocouple 202 at T2 may have a short-circuit failure mode with a hypothetical output value of 30 mV. In the example shown in FIG. 6 with 1,000° C., the other thermocouples 202 in the set 204 may generate an output vale of ~41 mV at this temperature. If the harness effects for this simple calculation are ignored, the average output from the thermocouple 202 set 204 will be the arithmetic average noted in Equation 1. For this case, the average output will be:

$$v(t_{1000C}) = (0 + 30 + 41 + 41 + 41 + 41)/6 \text{ mV}_{dc} \text{ or } 32.3 \text{ mV}.$$

This resulting value would correspond to a Type K output of about 760° C. and would be well outside the boundaries of the expected Class 1 expect for such a measurement. Due to scenarios such as this example, redundant sets 204 and arrays 200 of thermocouples 202 are used to have a backup temperature measurement for critical operating parameters and locations for example, in gas turbine engines 100. In addition to open-circuit and close-circuit failure modes, thermocouple drift is another type of failure mode that may affect the accuracy of the system. During thermocouple drift, the thermocouple 202 de-calibrates itself and the output value drifts due to the thermocouple 202 being exposed to high temperatures for long periods of time. This exposure results in un-wanted levels of oxidation that result in the output changing and the thermocouple 202 falling out of the desired accuracy band.

Figure 7:
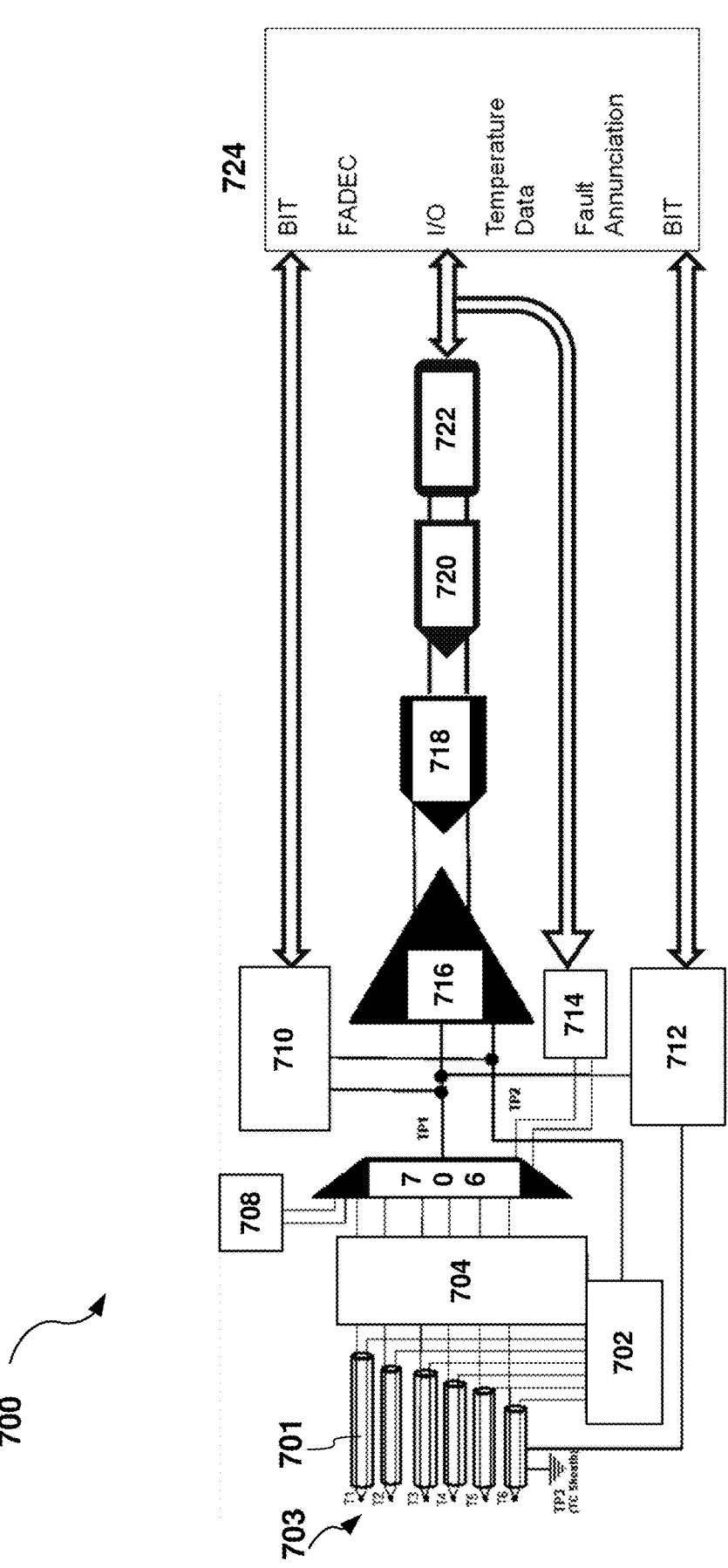
FIG. 7 illustrates a schematic of an example temperature measurement system.

FIG. 7 illustrates an example of an example of a temperature measurement system 700. The system 700 may comprise temperature sensors 701, a K-return and isothermal block 702, additional isothermal blocks 704, a multiplexer 706, a cold junction compensation (CJC) block 708, a continuity test circuitry block 710, an impedance test circuitry block 712, a multiplexer address line 714, an amplifier 716, an analog to digital converter 718, a sample and hold block 720, a data buffer 722, and a controller 724. The components may all be connected, for example, by wires and/or a wire harness. The wire harness may be able to transmit output, inputs, and/or electrical signals between the components.

The temperature sensors 701 may be, for example, any device capable of detecting ambient temperature and transmitting a sensor reading. The temperature sensors 701 may, for example, be thermocouples. The temperature sensors 701 may, for example, be K-type thermocouples such as the ones describe above and/or shown in FIGS. 2-4. The temperature sensors 701 may be, for example, class 1 thermocouples. The temperatures sensors 701 may be included in an array or set 703 of sensors.

The system 700 may comprise a plurality of temperature sensors 701, for example, between two and ten temperature sensors 701. The temperature sensors 701 may be arranged in a set or an array. Each array location with one of the temperature sensors 701 may have a corresponding unique address. Each temperature sensor 701 and its corresponding location in the array may have a unique address. As described above, the temperature sensors 701 may be arranged, for example, around a section of a gas turbine engine 100, with the tips of the temperature sensors, or the junctions 306 (as shown in FIGS. 3A-3B) extending inside of the engine 100 exposed to the hot gas path. However, unlike the temperature sensor arranged in parallel as shown in FIGS. 2, 5, and 6, the temperature sensors 701 in may instead be connected to the K-return and isothermal block 702 and to the multiplexer 706 though the additional isothermal block 704. The temperature sensors 701 may also be grounded, for example, through the sheath 308 (shown in FIGS. 3A-3B)

The isothermal and K-return block 702 may be, in the example of thermocouples, the terminal block attachment points which the thermocouple wires are coupled by high-temperature solder (e.g. weld bead), aluminum tape, epoxy, polymide Kapton tape or the like to a common electrical potential for the negative side (K– wires) of each of the temperature sensors 701. The isothermal and K-return block 702 may maintain the difference between the two metals used in the thermocouple in order to generate the respective thermocouple voltage representative of temperature. In addition, the isothermal and K-return block 702 may maintain the thermocouple return lead wires at the same temperature at the junction. The isothermal and K-return block 702 may be connected to the temperature sensors 701 and to the amplifier 716.

The isothermal block 704 may be any device capable of connecting to terminal junctions of the temperature sensors 701 and able to keep the temperature the same or equalized across the all of the temperature sensor 701 junctions. The isothermal block 704 may connect the temperature sensors 701 to the multiplexer 706.

The multiplexer 706 may be any device capable of indexing, isolating, or selecting one the temperature sensor

701 outputs from the plurality of temperature sensors 701 in a respective array. The multiplexer 706 may individually select and index each temperature sensor 701 one at a time, and run each temperature sensor 701 individually through the system 700, for example, through the impedance test circuitry 712 and the continuity test circuitry 710. For example, the multiplexer 706 may have one output and multiple inputs, with each input connected to one of the temperature sensors 202. When indexing or cycling through the temperature sensors 202, the multiplexer 706 may connect only one temperature sensor input to the rest of the system 700 through the output of the multiplexer 706. The multiplexer 706 may alternate and sequence through which temperature sensor input is connected to the single output at regular intervals to connect each temperature sensor input with the output one at a time.

The multiplexer 706 may be connected to the temperature sensors 701 through the isothermal block 704, and may be connected and/or may connected the temperature sensors 701 individually to the impedance test circuitry 712, the continuity circuitry 710, and/or the amplifier 716. Additionally or alternatively, the multiplexer 706 may be connected to the CJC block 708 and/or the multiplexer address line 714.

The CJC block 708 may be any device or process capable of adjusting the output voltage from the temperature sensors 701 such that a reference junction appears to be at 0° C. even if it is not. For example, the CJC block 708 may be comprise or be connected to another temperature sensor to establish an absolute temperature for measurement. The CJC block 708 may correct the temperature back to an absolute temperature by zeroing out ambient effects to get an absolute reading from the temperature sensors 701. The CJC block 708 may be connected to the multiplexer 706.

The continuity test circuitry 710 and the impedance test circuitry 712 are shown and discussed in more detail with reference to FIGS. 8 and 9. The continuity test circuitry 710 and the impedance test circuitry may be connected to an output of the multiplexer 706 and may be connected to the amplifier 716.

The multiplexer address line 714 may be a communication line between the multiplexer 706 and controller 724 used to communicate the address of the temperature sensor 701 being selected by the multiplexer 706 and/or tested by the test circuitry 710, 712. The address of the temperature sensor 701 selected by the multiplexer 706 may be sent to the controller 724 through the address line 714 and the data timestamped. Additionally or alternatively, address line 714 may be used to send a selected address from the controller 724 to the multiplexer 706 to instruct the multiplexer 706 which temperature sensor 701 and corresponding address to test next.

The amplifier 716 may be any device capable of increasing voltage, current, and/or power of a signal or current running through the amplifier 716. The amplifier 716 may, for example, be connected to and may increase the strength of the signal from the temperature sensor 701 flowing through the multiplexer 706. Additionally or alternatively, the amplifier 716 may be connected to and may increase the strength of the signal from the continuity test circuitry 710, the impedance test circuitry 712, or the controller 724 as the signal flows to any components of the system 700.

The analog to digital converter 718 may be any device capable of converting an analog signal to a digital signal. The analog to digital converter 718 may, for example, be connected to the amplifier and/or the sample and hold block 720. The analog to digital converter 718 may, for example, convert the analog output signal from the temperature sensor 202, the continuity test circuitry 710, and/or the impedance test circuitry 712 to a digital signal for processing by the controller 724 and/or other components of the system 700.

The sample and hold block 720 may be any device or block of circuitry capable of holding a varying or changing input signal and holding or temporarily storing the signal so it has time to be processed by another component of the system 700. For example, the sample and hold block 720 may be connected to the amplifier and/or data buffer. The sample and hold block 720 may hold a signal coming in from a temperature sensor 701, the continuity test circuitry 710, and/or the impedance test circuitry 712, for example, that is coming through the multiplexer 706 and/or the amplifier 716. The sample and hold block 720 may hold the incoming signal long enough, for example, for the data buffer 722 and/or the controller 724 to process the signal.

The data buffer 722 may be any device capable of temporarily storing data. For example, the data buffer 722 may be connected to the controller 724 and/or the sample and hold block 720. The data buffer 722 may, for example, store data inputs coming from the sample and hold block 720 and/or other components of the system 700 and may store the input data for later processing by the controller 724.

A wire harness may connect the components of the system 700 to each other as described above such that the components are connected and/or in communication with each other and able to transport signals from one component to another. Additionally or alternatively, certain components, for example, at least the temperature sensors 701, and multiplexer 706 may be disposed near the section of the engine 100 the temperature sensors 701 are monitoring, while the controller 724 may be located and/or other components of the system 700 are disposed elsewhere in the engine 100 or aircraft. This way, only a single harness is needed to extend the distance between the multiplexer 706 and any other components of the system 700.

The controller 724 may be any circuitry capable of sending instructions and/or commands to the components of the system 700, for example, such as the multiplexer 706, the address line 714, the data buffer 722, and the test circuitry blocks 710, 712. The controller 724 may be any circuitry capable of receiving data form the components of the system 700, for example, such as the multiplexer 706, the address line 714, the data buffer 722, and the test circuitry blocks 710, 712. For example, the controller 724 may include a full authority digital engine control system (FADEC). Alternatively, the controller 724 may be a separate circuitry from the FADEC and communicate with the FADEC.

During operation the controller 724 may identify a specific address of the array 703 corresponding to the location of a single one of the temperature sensors 701. The selected address may be sent via the address line 714 to the multiplexer 706, and the multiplexer 706 may isolate the temperature sensor 701 corresponding to the identified address. The multiplexer 706 may connect the isolated temperature sensor 701 to the test circuitry blocks 710, 712 to be tested as described below. The results of the testing and/or any faults detected by the test circuitry blocks 710, 712 may be communicated to the controller 724. The controller 724 and/or the system 700 may work to isolate any faulty temperatures sensors 701 detected, for example, a temperature sensor 701 determined to have an open-circuit or closed-circuit failure. The failed sensor 701 may further be removed or discounted from any average temperature calculations done by, for example, the controller 724 to monitor the temperature of the engine 100 location where the sensor array 703 is located.

The multiplexer 706 may automatically index or cycle through the temperature sensors 701 repeatedly at regular time intervals, continuously testing the temperature sensors 701. Additionally or alternatively, the controller 724 may instruct the multiplexer 706 to index through the temperature sensors 701 and the system 700 to test each one of the temperature sensors 701 upon receipt of a calibration command. The controller 724 may, for example, receive a calibration command from a user input and accordingly control the system 700 and multiplexer 706 to index through and test each temperature sensor. Additionally or alternatively, the controller 724 may control the control the system 700 and multiplexer 706 to index through and test each temperature sensor at regular intervals. Additionally or alternatively, upon detection of a failed temperature sensor 701, for example upon detection of an open or closed circuit failure, the controller 724 may output a fault or maintenance alert.

Figure 8:
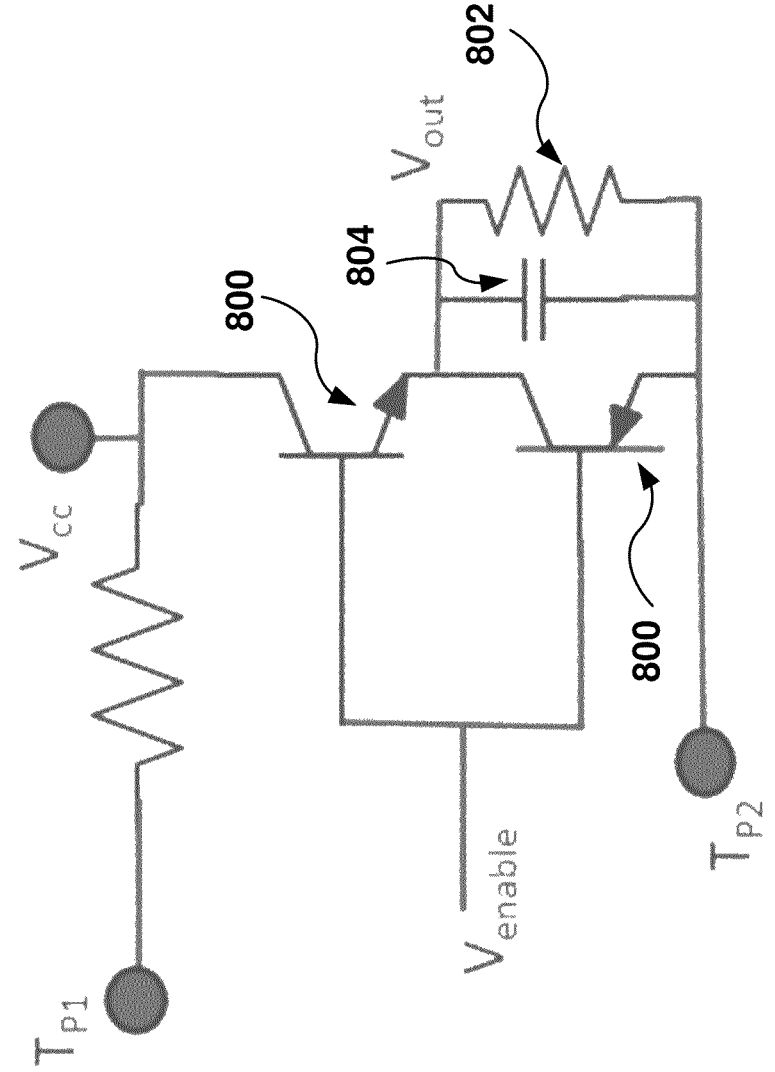
FIG. 8 illustrates a schematic of a continuity test circuitry.
Figure 8:
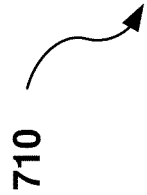

FIG. 8 illustrates a more detailed view of an example of the continuity test circuitry block 710 shown in FIG. 7. The continuity test circuitry 710 may, for example, be able to detect or test for an open-circuit failure in one of the temperature sensors 701. The continuity test circuitry 710 may comprise, for example, two test nodes $T_{P1}$, $T_{P2}$, two transistors 800, a resistor 802, a capacitor 804, a voltage supply or excitation circuit $V_{CC}$, an enabling voltage $V_{enable}$, and a output voltage $V_{out}$.

The transistors 800 may, for example, be bipolar transistors and may, for example, be arranged in a totem pole configuration. The voltage supply $V_{CC}$ may be a supply voltage to energize or excite the test circuitry 710. For example, $V_{CC}$ may be between 1-10 V, and may verify a relatively low resistance value between $T_{P1}$ and $T_{P2}$ when the test circuitry is enabled. The controller 724, for example, the FADEC may come in through the $V_{enable}$ connection.

If a circuit is not made in the test circuitry 710, for example, if there is an open-circuit condition in the temperature sensor 701 being tested, no current will flow and $V_{out}$ will be a relatively low voltage, for example 0V. The low voltage of $V_{out}$ will indicate that an open circuit is detected, wherein $V_{out}$ indicates failure of temperature sensor 701, and a fault may be annunciated to the controller 724 for a specific temperature sensor 701 in the system 700. Alternatively, $V_{out}$ may stay relatively high as long as the resistance between the two test nodes is low.

Figure 9:
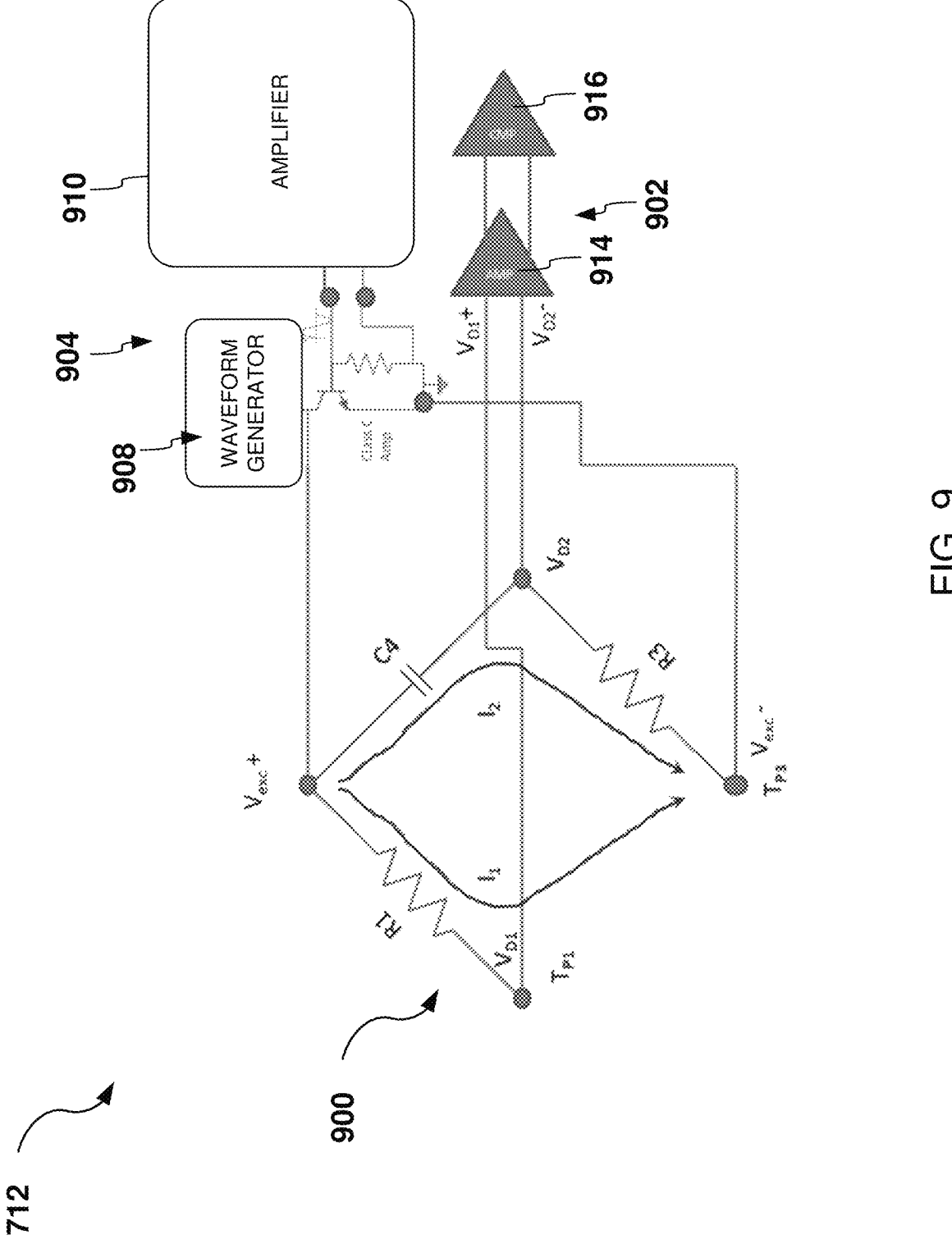
FIG. 9 illustrates a schematic of an impedance test circuitry.

FIG. 9 illustrates a more detailed view of an example of the impedance test circuitry block 712 shown in FIG. 7. The impedance test circuitry 712 may comprise an impedance determination circuit 900, such as a Wheatstone bridge. The Wheatstone bridge 900 of this example may include two resistors R1, R3, which may have equal resistance values, and a capacitor C4, which has a capacitance equal to what the expected capacitance of one of the temperature sensors 701 is. The Wheatstone bridge 900 may also include two test nodes $T_{P3}$, $T_{P1}$ where the temperature sensor 701 is connected to the test circuitry 712.

During operation, the Wheatstone bridge 900 may be excited by a voltage $V_{exc}$ across the test nodes $T_{P3}$, $T_{P1}$ with, for example, a half sine input. The test circuitry 712 may further comprise, for example, a comparator circuit 902, and a excitation circuit 904. The excitation circuit 904 may include a full wave generator 908, such as an AD 9833 AF Waveform Generator made by ANALOG DEVICES, and amplifier 910, such as a Class C amplifier generating an excitation voltage (Vexc+ and Vexc−) for the impedance determination circuit 900.

During operation, an approximately 1V sinusoidal signal may be supplied across the bridge 900 by the excitation circuit 904, and variations in the capacitance between $T_{P3}$, $T_{P1}$ may be monitored. The test circuitry 712 may detect the differential between $V_{D1}$ and $V_{D2}$ using the comparator circuit 902 The greater the variation may flag a shift in impedance of the temperature sensor 701 being tested as, for example, an insulation material of a temperature sensor 701 weakens or breaks down.

The nominal capacitance of each temperature sensor 701 in the assembly (for example, set or array 703) of the system 700 may be 1-2 pF range when, for example, the assemblies are new and the insulating materials of the temperature sensors 701 have not been compromised, such as by being contaminated with fuels or other hydrocarbons that may be present in the engine 100. When, for example, an excitation frequency on the order of 10 KHz is applied across the bridge 900, the impedance of the temperature sensor 701 may be on the order of 8 to 15 MΩ. As the temperature sensors 701 age, the capacitance may increase due to the contamination of the temperature sensors 701. As, for example, the capacitance increases to approximately 5 pF, the impedance of the test nodes $T_{P3}$, $T_{P1}$ may decrease to approximately 3 MΩ. This impedance shift is significant enough to be captured by the comparator block 902 of the test circuitry 712 monitoring voltages VD1+ and VD1−.

The comparator block 902 may include an amplifier 914 and a comparator 916 to compare a difference in the amplified VD1+ and VD1− voltage levels. In some examples, the amplifier 914 may be omitted where differences in the level of voltages of VD1+ and VD1− are sufficient for direct sensing with the comparator 916. During operation, when an impedance change such as this occurs, the output from the comparator block 902 in this test circuitry block 712 may annunciate a fault to the controller 724 the specific temperatures sensor 701 of the system 700 being tested.

Figure 10:
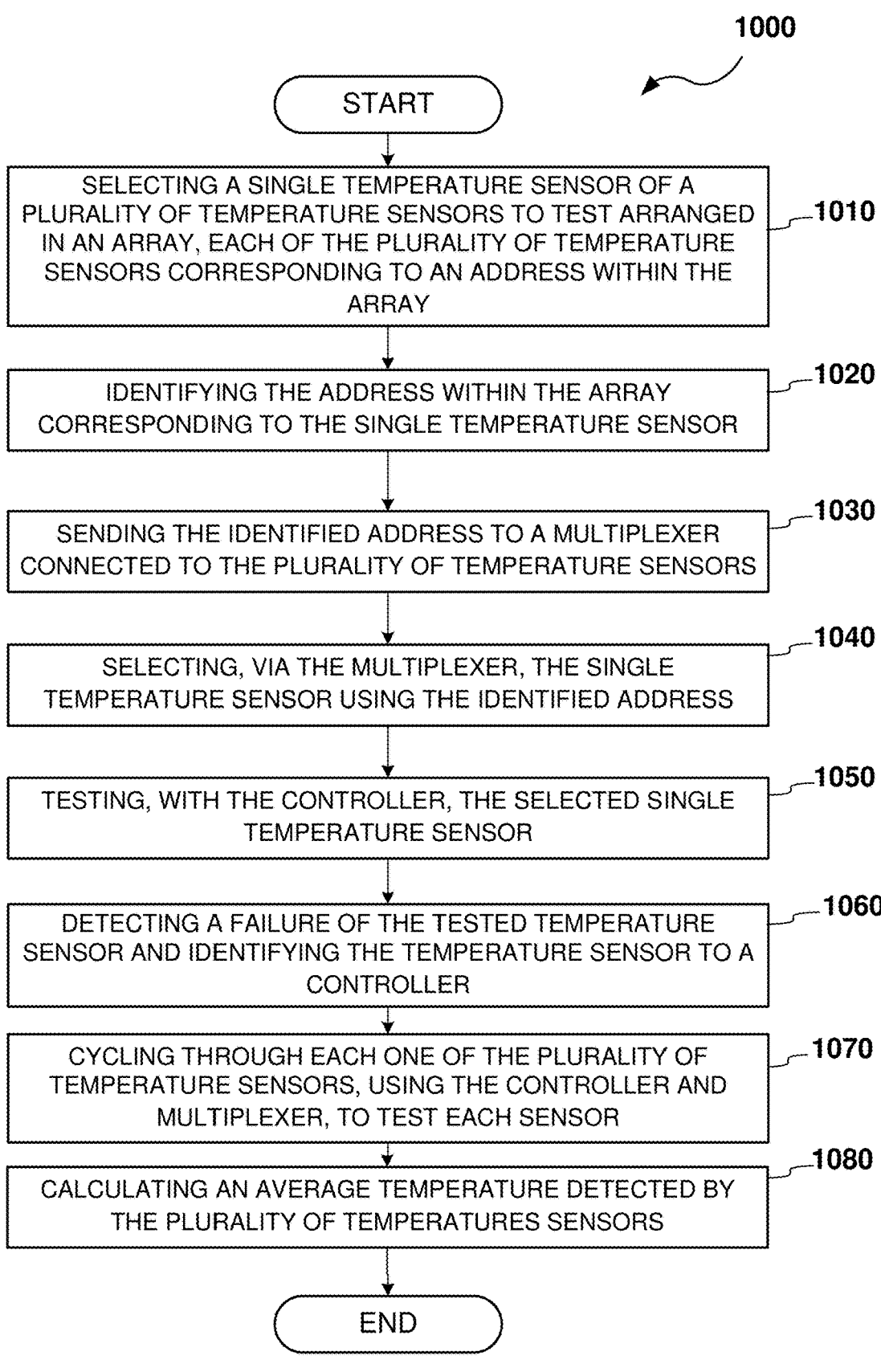
FIG. 10 illustrates an example of steps for monitoring the health of a temperature measurement system.

FIG. 10 illustrates a flow diagram of an example steps 1000 to monitor the health of the temperature measurement system 700. The multiplexer 706 and/or controller 724 may select a single temperature sensor 701 of the plurality of temperature sensors to test (1010). The plurality of temperature sensors may be arranged in an array 703, each of the plurality of temperature sensors 701 may correspond to an address within the array 703. The controller 724 may identify the address within the array 703 corresponding to the single temperature sensor 701. The controller 724 may send the identified address to the multiplexer 706 connected to the plurality of temperature sensors. The multiplexer 706 may select the single temperature sensor 701 using the identified address. The controller 724 and/or test circuitry 710, 712 may test the selected single temperature sensor 701. The controller 724 and/or test circuitry 710, 712 may detect a failure of the tested temperature sensor 701 and identify the temperature sensor 701. The multiplexer 706 and/or controller 724 may cycle through each one of the plurality of temperature sensors to test each sensor 701. The controller 724 may calculate an average temperature detected by the plurality of temperatures sensors. The steps may include additional, different, or fewer operations than illustrated in FIG. 10. The steps may be executed in a different order than illustrated in FIG. 10.

Figure 11:
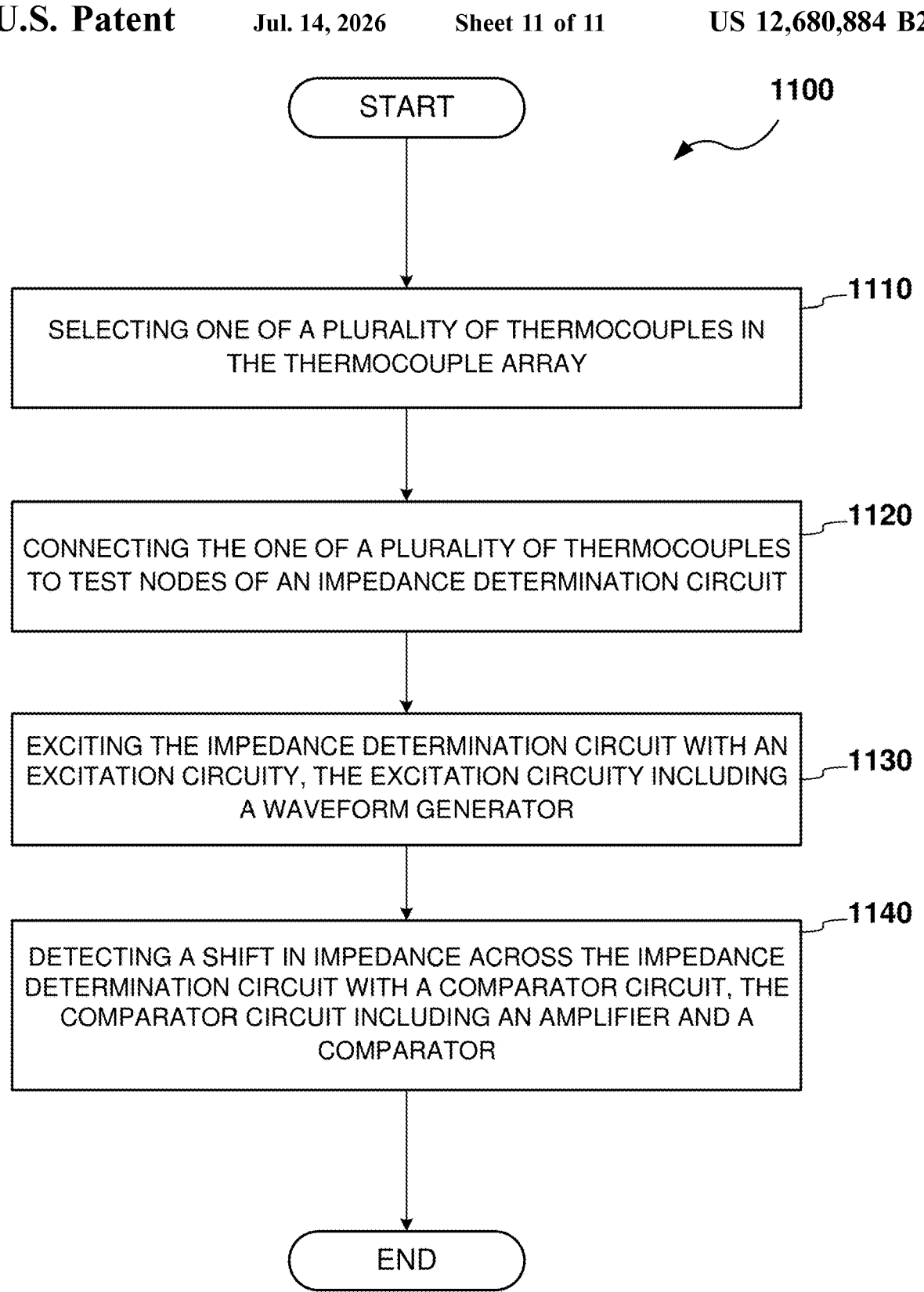
FIG. 11 illustrates an example of steps for detecting a failure in a thermocouple array.

FIG. 11 illustrates a flow diagram of an example of steps 1100 for detecting a failure in a thermocouple array. The multiplexer 706 and/or controller 724 may select one of the plurality of thermocouples in the thermocouple array (1110). The multiplexer 724 may connect the one of a plurality of thermocouples to test nodes $T_{P1}$, $T_{P3}$ of the impedance determination circuit 900 (1120). The impedance determination circuit 900 may include the capacitor C4, wherein the capacitor C4 has a capacitance equal to an expected capacitance of the one of the plurality of thermocouples. The controller 724 and/or system 700 may excite the impedance determination circuit 900 with the excitation circuitry 904 (1130). The excitation circuitry 904 may include the waveform generator 908. The controller 724 and/or impedance test circuitry 712 may detect a shift in impedance across the impedance determination circuit 900 with the comparator circuit 902 (1140). The comparator circuit 902 may include the amplifier 914 and the comparator 916. The steps may include additional, different, or fewer operations than illustrated in FIG. 11. The steps may be executed in a different order than illustrated in FIG. 11.

Each component may include additional, different, or fewer components. For example, the test circuitry blocks 710, 712 may comprise additional testing or electrical components. Additionally or alternatively, the array 703 may comprise additional or fewer temperature sensors 701.

The system 700 may be implemented with additional, different, or fewer components. For example, the system 700 may include additional components or circuitry.

The logic illustrated in the flow diagrams may include additional, different, or fewer operations than illustrated. The operations illustrated may be performed in an order different than illustrated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method of monitoring a health of a temperature system, the method comprising: selecting a single temperature sensor of a plurality of temperature sensors to test, the plurality of temperature sensors arranged in an array, each of the plurality of temperature sensors corresponding to an address within the array; identifying, via a controller, the address within the array corresponding to the single temperature sensor; sending the identified address to a multiplexer connected to the plurality of temperature sensors; selecting, via the multiplexer, the single temperature sensor using the identified address; testing, with the controller, the selected single temperature sensor; and calculating an average temperature detected by the plurality of temperatures sensors.

A second aspect relates to the method of aspect 1 further comprising detecting a failure of the testing of the selected single temperature sensor and identifying the selected single temperature sensor to the controller.

A third aspect relates to the method of any preceding aspect further comprising removing, with the controller, a detected failed temperature sensor from the average temperature calculation.

A fourth aspect relates to the method of any preceding aspect further comprising cycling through each one of the plurality of temperature sensors, using the controller and multiplexer, to test each one of the plurality of temperature sensors.

A fifth aspect relates to the method of any preceding aspect wherein the array comprises the plurality of temperature sensors arranged in parallel.

A sixth aspect relates to the method of any preceding aspect wherein the array is disposed in an exhaust stage or in a combustor stage of a gas turbine engine.

A seventh aspect relates to the method of any preceding aspect wherein the controller is a full authority digital engine control (FADEC) of a gas turbine engine.

An eighth aspect relates to the method of any preceding aspect wherein the plurality of temperature sensors are thermocouples.

A ninth aspect relates to the method of any preceding aspect wherein the plurality of temperature sensors comprises at least six temperature sensors.

A tenth aspect relates to the method of any preceding aspect further comprising selecting and testing each one of the plurality of temperature sensors individually at regular intervals.

An eleventh aspect relates to the method of any preceding aspect further comprising indexing through and testing each one of the plurality of temperature sensors upon receipt of a calibration instruction.

A twelfth aspect relates to a temperature measurement system, the system comprising: a plurality of temperature sensors arranged in an array, wherein each of the temperature sensors has a corresponding respective address; a multiplexer in selective communication with each one of the plurality of temperature sensors to isolate a single temperature sensor of the plurality of temperature sensors; a controller in communication with the multiplexer to identify a single temperature sensor to be selected by the multiplexer; and test circuitry in communication with the controller to test a health of the isolated single temperature sensor.

A thirteenth aspect relates to the system of aspect 12 wherein the array is disposed in a combustor stage of a gas turbine engine.

A fourteenth aspect relates to the system of any preceding aspect wherein the array is disposed in an exhaust stage of a gas turbine engine.

A fifteenth aspect relates to the system of any preceding aspect wherein the controller is a full authority digital engine control (FADEC) of a gas turbine engine.

A sixteenth aspect relates to the system of any preceding aspect wherein the plurality of temperature sensors are thermocouples.

A seventeenth aspect relates to a method of monitoring a health of a temperature system, the method comprising: selecting a single temperature sensor of a plurality of temperature sensors to test, the plurality of temperature sensors arranged in an array, each of the plurality of temperature sensors corresponding to an address within the array; identifying the address within the array corresponding to the single temperature sensor; sending the identified address to a multiplexer connected to the plurality of temperature sensors; selecting, via the multiplexer, the single temperature sensor using the identified address; testing the selected single temperature sensor with test circuitry; detecting a failure of the tested temperature sensor and identifying the temperature sensor to a controller; and cycling through each one of the plurality of temperature sensors, using the controller and multiplexer, to test each sensor.

An eighteenth aspect relates to the method of any preceding aspect further comprising calculating an average temperature detected by the plurality of temperatures sensors, wherein any detected failed temperature sensor is removed from the average temperature calculation.

A nineteenth aspect relates to the method of any preceding aspect further comprising repeatedly cycling through and testing each one of the plurality of temperature sensors at regular intervals.

A twentieth aspect relates to the method of any preceding aspect further comprising signaling a maintenance alert when a failure of one of the plurality of temperature sensors is identified.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of monitoring a health of a temperature system location, the method comprising:
choosing a single temperature sensor of a plurality of temperature sensors to test, wherein the plurality of temperature sensors are arranged in an array, each of the plurality of temperature sensors corresponding to an address within the array;
identifying, via a controller, the address within the array corresponding to the single temperature sensor;
sending the identified address to a multiplexer connected to the plurality of temperature sensors;
selecting, via the multiplexer, the single temperature sensor using the identified address;
testing, with the controller and a testing circuitry comprising an impedance determination circuit, for a closed-circuit failure mode of the selected single temperature sensor by at least detecting for a shift in impedance of the selected single temperature sensor;
cycling through each one of the plurality of temperature sensors, repeating the choosing, identifying, sending, selecting, and testing for each of the plurality of temperature sensors; and
calculating an average temperature of a location containing the plurality of temperature sensors using individual temperature measurements of the plurality of temperature sensors.

2. The method of claim 1, further comprising removing, with the controller, the individual temperature measurements of one or more temperature sensors of the plurality of temperature sensors for which the shift in impedance is detected from the average temperature calculation.

3. The method of claim 1 wherein the array comprises the plurality of temperature sensors arranged in parallel.

4. The method of claim 1 wherein the array is disposed in an exhaust stage or in a combustor stage of a gas turbine engine.

5. The method of claim 1 wherein the controller is a full authority digital engine control (FADEC) of a gas turbine engine.

6. The method of claim 1 further comprising selecting and testing each one of the plurality of temperature sensors individually at regular intervals.

7. The method of claim 1 further comprising indexing through and testing each one of the plurality of temperature sensors upon receipt of a calibration instruction.

8. The method of claim 1, wherein the testing further comprises connecting the single temperature sensor to one or more nodes of a Wheatstone bridge.

9. A temperature measurement system, the system comprising:
a plurality of temperature sensors arranged in an array, wherein each of the temperature sensors has a corresponding respective address;
a multiplexer in selective communication with each one of the plurality of temperature sensors to select a single temperature sensor of the plurality of temperature sensors;
test circuitry configured to test for a closed-circuit failure mode of the single temperature sensor, wherein the test circuitry comprises an impedance determination circuit configured to connect to the single temperature sensor and detect for an impedance shift of the single temperature sensor; and
a controller in communication with the multiplexer and the test circuitry, wherein the controller is configured to, responsive to the test circuitry detecting the impedance shift, isolate the single temperature sensor from the plurality of temperature sensors.

10. The system of claim 9 wherein the array is disposed in a combustor stage of a gas turbine engine.

11. The system of claim 9 wherein the array is disposed in an exhaust stage of a gas turbine engine.

12. The system of claim 9 wherein the controller is a full authority digital engine control (FADEC) of a gas turbine engine.

13. The system of claim 9, wherein the impedance determination circuit comprises a Wheatstone bridge.

14. The system of claim 13, wherein the impedance determination circuit further comprises a comparator circuit.

15. The system of claim 14, wherein the impedance determination circuit further comprises an excitation circuit.

16. A method of monitoring a health of a temperature system, the method comprising:
choosing a single temperature sensor of a plurality of temperature sensors to test, wherein the plurality of temperature sensors arranged in an array, each of the plurality of temperature sensors corresponding to an address within the array;
identifying the address within the array corresponding to the single temperature sensor;
sending the identified address to a multiplexer connected to the plurality of temperature sensors;
selecting, via the multiplexer, the single temperature sensor using the identified address;
testing the selected single temperature sensor for a closed-circuit failure mode by at least detecting for a shift in an impedance of the selected single temperature sensor with testing circuitry;
detecting a closed-circuit failure mode of the tested temperature sensor based on the shift in the impedance and identifying the selected single temperature sensor to a controller; and cycling through, using the controller and multiplexer, each one of the plurality of temperature sensors, repeating the testing for each sensor.

17. The method of claim 16 further comprising calculating an average temperature detected by the plurality of temperatures sensors, wherein any detected failed temperature sensor is removed from the average temperature calculation.

18. The method of claim 16 further comprising repeatedly cycling through and testing each one of the plurality of temperature sensors at regular intervals.

19. The method of claim 16 further comprising signaling a maintenance alert when a failure of one of the plurality of temperature sensors is identified.

20. The method of claim 16, wherein the testing further comprises connecting the single temperature sensor to one or more nodes of a Wheatstone bridge.

* * * * *